March 23, 1937.  W. M. DWYER  2,074,464

HATCH COVER FASTENER AND LOCK

Filed May 3, 1934   3 Sheets-Sheet 1

Inventor
William M. Dwyer
By Henry Fuchs Atty.

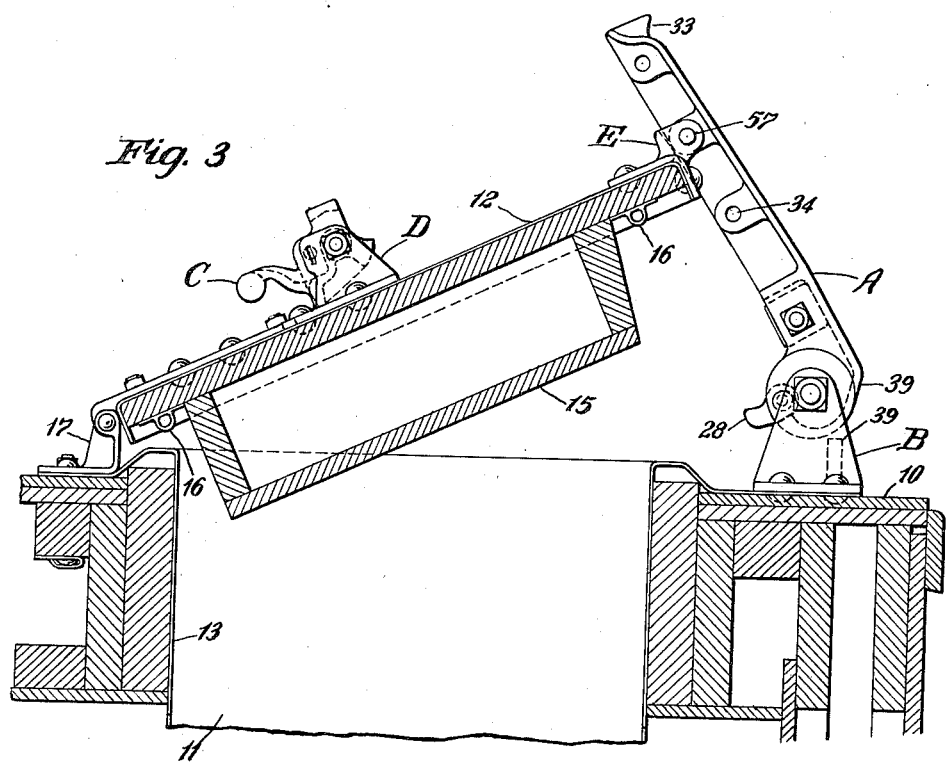
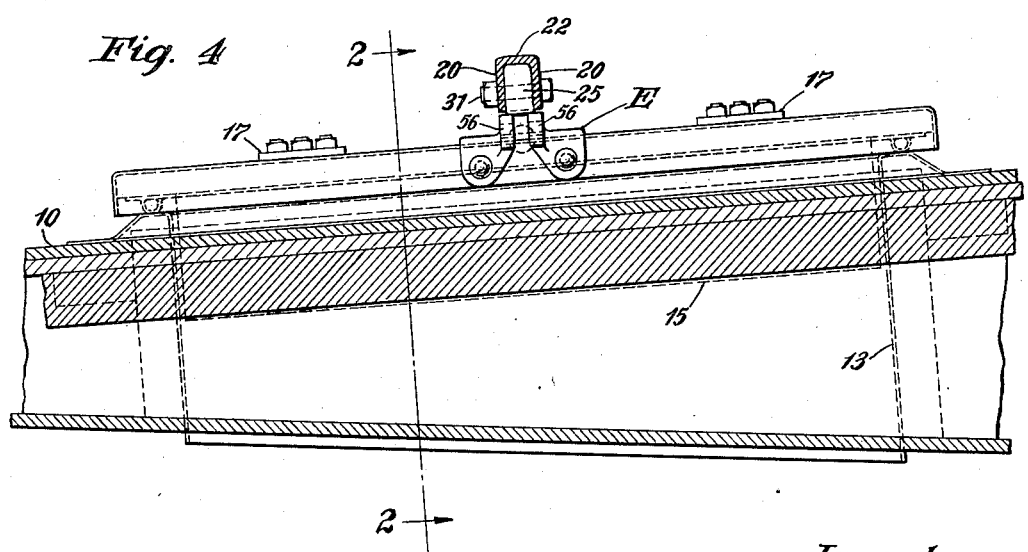

March 23, 1937. W. M. DWYER 2,074,464
HATCH COVER FASTENER AND LOCK
Filed May 3, 1934 3 Sheets-Sheet 3
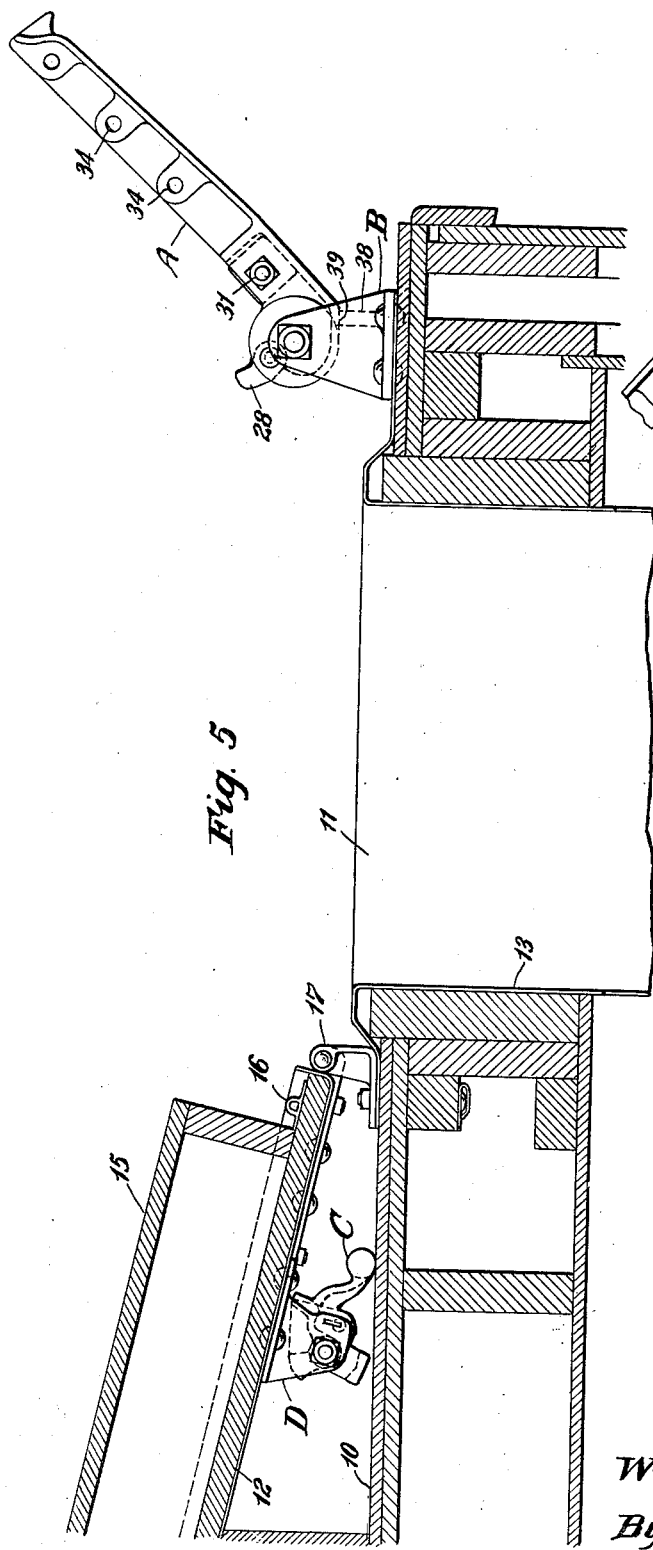
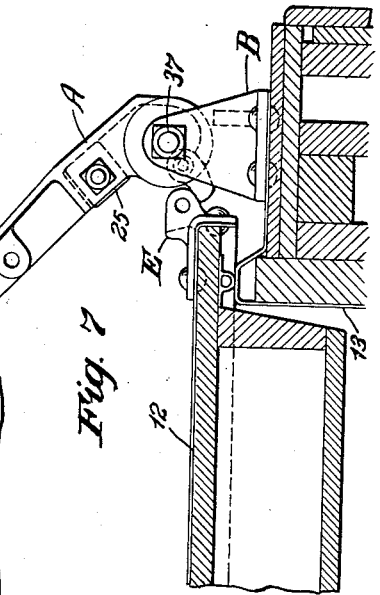
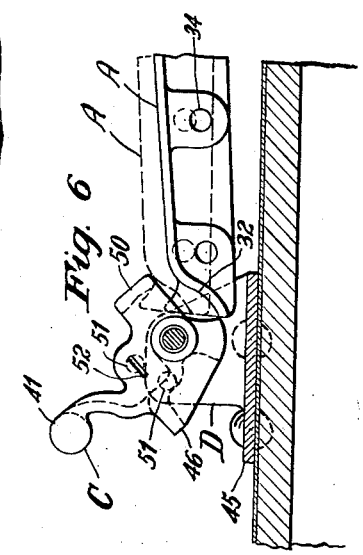
Inventor
William M. Dwyer
By Henry Fuchs Atty.

Patented Mar. 23, 1937

2,074,464

UNITED STATES PATENT OFFICE 2,074,464

HATCH COVER FASTENER AND LOCK

William M. Dwyer, Chicago, Ill., assignor to W. H. Miner, Inc., Chicago, Ill., a corporation of Delaware Application May 3, 1934, Serial No. 723,677

14 Claims. (Cl. 98—7)

This invention relates to improvements in combined fastener and locking means for hatch covers of refrigerator cars.

One object of the invention is to provide a fastener for hatch covers comprising a single lever arm which is employed to pry cover open or force it tightly closed, and further serves as a support to hold cover partly open.

Another object of the invention is to provide a pivoted lever for forcing a hatch cover to tightly closed position wherein the lever is locked in position folded over the cover to hold the latter tightly closed.

A further object of the invention is to provide latch means in connection with a fastening lever of the character described, which latch means is designed to automatically interlock with the lever when latter is in cover closing position.

Yet another object of the invention is to provide in combination with a latch means of the character set forth, a safety device which automatically checks movement of lever when latch means is manually released, thereby protecting the operator against accidental injury.

A further object of the invention is to provide a mechanism of the character set forth, including an operating lever carrying a dog which is engageable with the hatch cover to force same open, wherein all the parts of the mechanism entirely clear the cover when open so that in case the cover is slammed shut it will not strike any part of the mechanism and cause damage, the dog of the operating lever being held clear of the cover by positively stopping movement of the lever in a predetermined position, said position being such that the lever does not project too far beyond the end of the car.

Other objects of the invention will more clearly appear from the description and claims hereinafter following.

Figure 1:
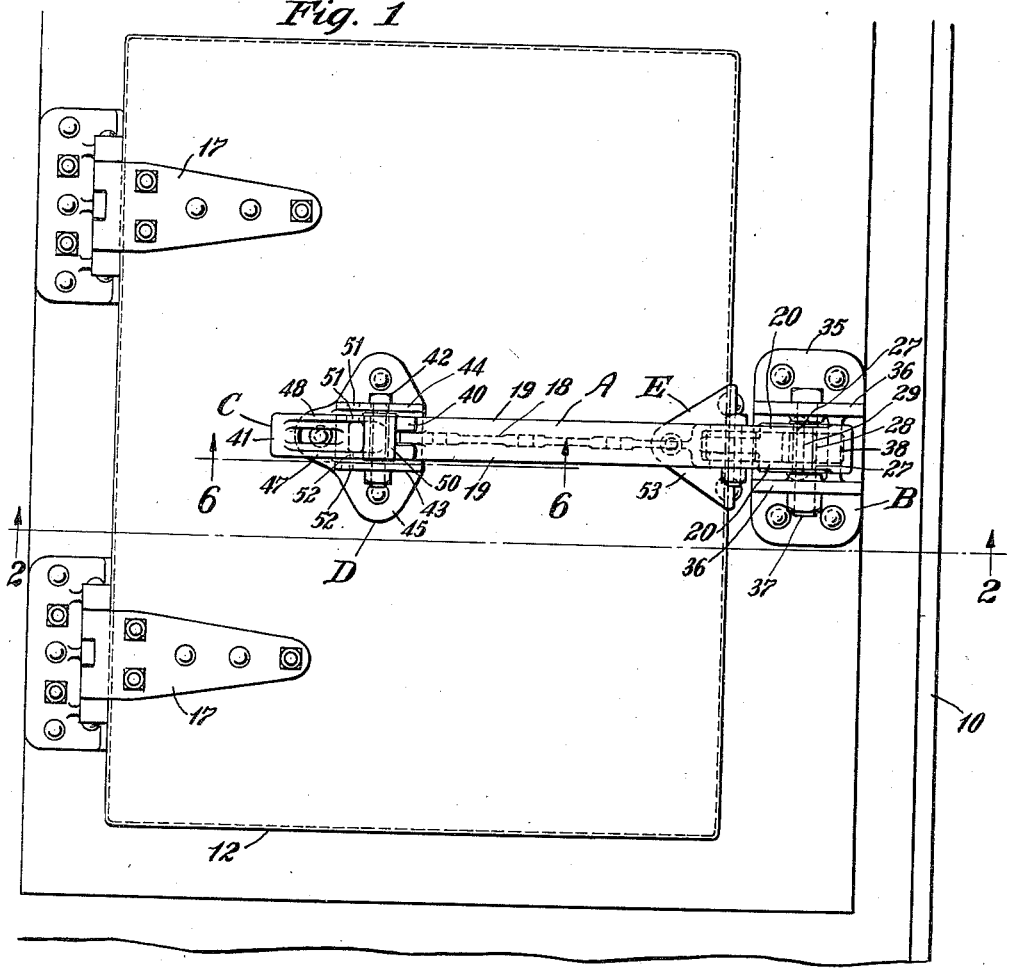
Figure 2:
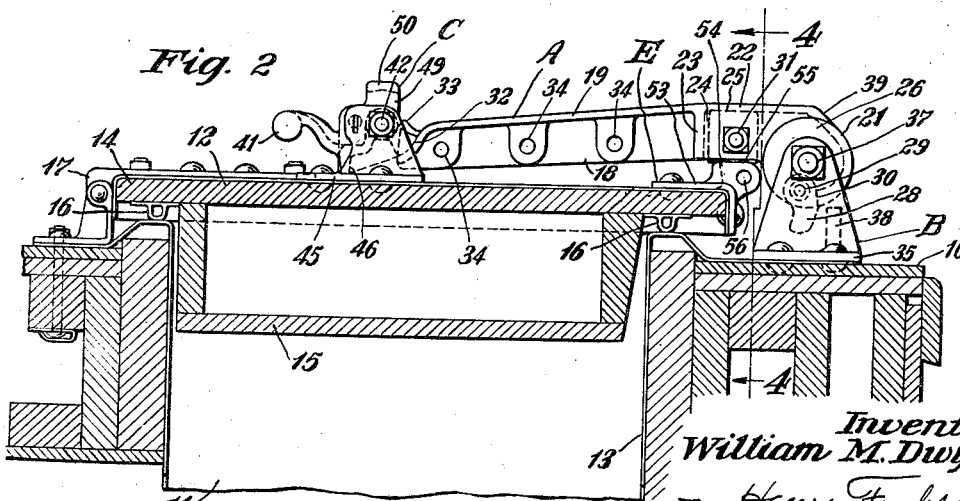

In the drawings, forming a part of this specification, Figure 1 is a plan view of a portion of the roof of a refrigerator car, showing the usual hatch cover and illustrating my improvements in connection therewith. Figure 2 is a vertical sectional view, corresponding substantially to the line 2—2 of Figures 1 and 4. Figure 3 is a view similar to Figure 2, but illustrating the hatch cover in partly open position and the combined fastening and locking means in a different adjustment. Figure 4 is a vertical sectional view, corresponding substantially to the line 4—4 of Figure 2. Figure 5 is a view similar to Figure 2, but showing the hatch cover fully opened. Figure 6 is a vertical sectional view, partly broken away, corresponding substantially to the line 6—6 in Figure 1, showing the fastening lever and cooperating latch in full lines, the latch being in unlocked position, and further showing in dotted lines the lever slightly raised and checked in its movement by the safety device. Figure 7 is a view similar to Figure 2, partly broken away, but showing the fastening lever in a different position.

In said drawings, 10 indicates a portion of the roof of a refrigerator car, 11 the usual hatchway, and 12 the hatch cover. As shown, the hatchway is provided with a lining 13, which extends slightly above the roof of the car and is folded outwardly in overlapping relation with the portion of the roof of the car immediately adjacent to said hatchway. The cover 12 comprises a substantially flat main body portion 14 and a projecting plug portion 15 on the inner side thereof. The plug portion 15 is seated in the hatchway 11 and the body portion 14 of the cover 12 overlaps the walls of the hatchway when the cover is in closed position. On the inner side surrounding the plug 15, the portion 14 of the cover 12 is provided with insulating material 16 which, when the cover is closed, is compressed against that portion of the lining 13 which overlaps the car roof adjacent to the hatchway, thereby sealing the opening between the cover and the car roof. As shown most clearly in Figures 1, 2, 3, and 5, the cover 12 is swingingly supported along one edge by a pair of hinges 17—17 secured to the car roof in any suitable manner.

My combined fastener and lock comprises broadly a lever A; a bearing bracket B to which the lever is pivoted; a combined latch and safety check member C; a supporting bearing bracket D on which the combined latch and check member is pivoted; and an abutment element E with which the lever A cooperates in forcing the cover closed, holding the same in fastened position, prying the cover open, and holding the latter in partly opened position.

The lever A is in the form of a bar of generally T-shaped cross-section comprising a vertical web 18 having laterally, oppositely projecting flanges 19—19 along the upper edge. At the right hand end of the lever A, as viewed in Figures 1, 2, 3, 5, and 7, a bearing portion is provided for pivotally connecting the lever A to the supporting bearing bracket B. The bearing section of said lever is formed by spaced side walls 20—20 which extend downwardly below the web 18, and a back wall 21 which is connected to the top wall 22 and the side walls 20—20. The top wall 22 forms a continuation of the flanges 19—19 of the lever. Spaced from the bearing portion of the lever is a transverse partition wall 23 which connects with the side walls 20—20, thereby providing a pocket 24 adapted to accommodate an adjustment block 25, more fully hereinafter described. As will be clear, the vertical web 18 of the lever A terminates at the wall 23. The pivotal bearing portion of the lever A, which is indicated by 26, comprises substantially circular sections which are slightly outwardly offset with respect to the side walls 20—20. The cylindrical sections 26—26 are provided with aligned openings 27—27 adapted to receive the pivot member. As clearly shown in Figure 2, a pivoted dog 28 is accommodated between the wall sections 26—26 immediately below the pivot openings 27—27, the dog 28 being swingingly supported on a pivot pin 29 fixed in said wall sections 26—26. The end wall 21 of the pivot portion of the lever A is curved, as clearly shown in Figures 2, 3, 5, and 7, and terminates at a point below the pivot openings of the lever A, as shown in Figure 2, thereby providing an abutment shoulder 30, which limits the swinging movements of the dog 28. The adjustment block 25 is held within the pocket 24 by means of a bolt 31 extending through the block and the side walls 20—20 of the lever A. The opening of the block 25 through which the bolt passes is off center, as indicated in Figure 2, thereby providing for four different positions of adjustment of said block. The block may be thus adjusted to project different distances below the lever A to compensate for flattening of the insulation or packing material 16 and for wear of the moving parts of the device, as hereinafter more fully set forth. At the left hand end, as shown in Figure 2, the top flanges 19—19 of the lever A extend downwardly and are curved, as indicated, to provide a curved seat 32 which cooperates with the combined latch and safety check C, as hereinafter more fully set forth. The left hand end of the lever is also provided with a stop lug 33 which is in alignment with the web 18, projects beyond the seat 32, and is in the form of an upstanding hook or horn, as clearly shown in Figures 2, 3, 5, and 6. The vertical web 18 of the lever A is further provided with a plurality of spaced pin-receiving openings 34—34—34, which are adapted to receive a locking pin which cooperates with the abutment element E, as hereinafter more fully described, for holding the hatch cover in partly opened position.

The bracket B, on which the lever A is pivotally supported, comprises a bottom plate 35 having spaced, upstanding bearing lugs 36—36 between which the end of the lever A is accommodated. The bottom plate 35 is secured to the roof of the car in any suitable manner. A bolt 37 extending through aligned openings at the upper ends of the pivot lugs 36—36 and the opening 27 of the lever A pivotally connects the lever to the bracket B. The bracket B is further provided with a transverse web 38 which extends between the lugs 36—36 and presents a top abutment face which cooperates with a flattened surface 39 on the lever A to arrest movement of the lever in the position shown in Figure 5.

The combined latch and check element C comprises a main body portion having a forked latching finger 40 at one end and an operating hand grip 41 at the other end. The end face of the forked section of the latching finger 40 is rounded so as to properly register with the curved surface of the seat 32 at the outer end of the lever A so as to hold the lever in locked position. The element C is pivotally supported in the bearing bracket D by means of a pivot bolt 42 extending through upstanding, spaced bearing lugs 43 and 44 of the bracket D. The bracket D also comprises a bottom plate 45 which is secured on the upper face of the portion 14 of the hatch cover. The bearing lugs 43 and 44 are formed integral with the plate 45. The element C is further provided with a depending heel portion 46 which engages with the bottom plate 45 of the bearing bracket D to limit the swinging movement of the element C when it reaches the position shown in Figure 2. The element C is further provided with spaced, vertical webs 47 and 48 above the hand grip 41, the webs being disposed at opposite sides of the element C and having upwardly extending portions 49—49 connected at their outer ends by a transverse section 50. As shown in Figure 6, the section 50 of the element C is adapted to be engaged by the lug 33 of the lever A when the element C is swung to the released position, thereby serving as means for checking upward swinging movement of the lever A. The web 48 of the element C and the lug 44 of the supporting bracket B are provided with aligned openings 51—51 which are adapted to receive a locking member, such as the usual padlock. The web 47 of the element C and the lug 43 of the bracket D are provided with aligned slots 52—52 which receive the usual car sealing member.

The abutment bracket E comprises an angle-shaped plate portion 53 which fits over the free edge of the door and is fixed thereto in any suitable manner. The plate 53 is further provided with an upstanding slotted abutment lug 54, which has a flat top face 55 adapted to be engaged by the bottom face of the adjustment block 24 of the lever A. The lug 54 projects beyond the edge of the door, as most clearly shown in Figures 2, 3, and 7, so as to be engaged by the dog 28 when the lever is swung in the proper direction to pry the cover 12 upwardly. The projecting portion of the lug 54 is preferably rounded off, as shown in Figures 2, 3, and 7. The slot of the lug 54 is adapted to receive the web 18 of the lever A when the latter is utilized to hold the hatch cover 12 in partly opened position, as shown in Figure 3. The lug 54 is provided with pin-receiving openings 56—56 which accommodate a locking pin 57 which may be engaged through one of the openings 34, as shown in Figure 3, to maintain the hatch cover in its partly opened position.

In forcing the hatch cover tightly closed, the cover is first swung from the full opened position shown in Figure 5 to approximately the position shown in Figure 2. The operating lever A is then swung from the position shown in Figure 5 to the position shown in Figure 2. As the lever A is thus swung, there will be no interference between the dog 28 and the abutment bracket E because the dog is free to swing about its pivot in a clockwise direction so as to clear the lug 54 of the bracket E. During the final movement of the lever A, the bottom face of the block 24 engages the upper face of the lug 54 of the abutment bracket E, thereby forcibly pressing the hatch cover 12 against the roof of the car and compressing the insulation 16. As the outer end of the lever A swings downwardly, it engages the combined latch and check element C, thereby causing the same to swing in a clockwise direction, as viewed in Figure 2, so that the finger 40 of the element C will clear the extremity of the lever A. When the lever A has been fully depressed, sufficient clearance is had to permit the element C to swing to the position shown in Figure 2, thereby engaging the rounded outer end of the finger 40 with the seat 32 at the extremity of the lever A, thus locking the lever in position. As will be evident, the hand grip 41 of the element C, in effect, forms a weight which causes the combined latch and check to return to the locking position shown in Figure 2. In order to assure full engagement between the rounded end of the finger 40 of the element C and the seat 32 of the lever A, the grip 41 is manually depressed. When the parts have been thus locked, the padlock may be engaged through the openings 51—51 of the element C and the supporting bearing bracket D. The usual car seal is then applied through the openings 52—52 of the bracket D and the element C.

To compensate for flattening of the insulation 16 due to long use which would otherwise cause leakage between the hatch cover 12 and the car roof, the block 24 may be adjusted to project a greater distance from the bottom of the lever arm A, thereby engaging the upper face of the lug 54 earlier in the closing operation of the lever and forcing the cover further down to compress the insulation to the proper extent to provide a tight seal. In adjusting the block 24, the bolt 31 is removed so that the block may be completely withdrawn from the opening and rotated about the axis of the bolt opening thereof to bring another face of the block, which is a greater distance from the axis of said opening than the face which has been in use, lowermost, so that the block will project a greater distance below the lever when replaced in the opening of the latter. When the block has been replaced in the lever, the bolt is again applied to securely lock the block in position. As hereinbefore pointed out, the bolt opening of the block is spaced different distances from the top, bottom, and side faces of the block, thereby permitting four possible positions of adjustment of the block to project the same different distances below the lever A.

In opening the hatch cover 12, the padlock and seal are first removed from the element C and the supporting bracket D. The element C is then swung from the position shown in Figure 2 to that shown in Figure 6 by pulling upwardly on the hand grip 41, the finger 40 is thus disengaged from the seat 32, thereby permitting upward movement of the outer end of the lever A. As shown in Figure 6, the wall section 50 of the element C is in such a position that it overhangs the hooked portion 33 of the lever A and checks its upward movement, thereby preventing accidental injury to the operator. After the movement of the lever A has been checked, the hand grip 41 of the element C is depressed so that the wall 50 will clear the hook 33 of the lever. The operator then swings the lever upward to approximately the position shown in Figure 7, whereupon the dog 28 will engage the bottom edge of the lug 54 of the bracket E. Further movement of the lever A in the same direction will cause the dog 28 to pry the cover 12 upwardly so as to free the cover from the opening of the hatchway 11. As will be evident, during the time that the dog 28 is employed to pry the cover 12 open it is held against movement by engagement with the shoulder 30 of the wall 21 of the lever A. After the hatch cover has been forced open, the lever may be dropped to the position shown in Figure 5, its movement being arrested in that position by engagement of the flat face 39 of the lever A with the web 38 of the bracket B. In the event that it is found desirable to hold the hatch cover in partly opened position, the lever is adjusted, as shown in Figure 3, and the cover 12 locked to the lever by means of the pin 57.

I have herein shown and described what I now consider the preferred manner of carrying out my invention, but the same is merely illustrative and I contemplate all changes and modifications that come within the scope of the claims appended hereto.

I claim:

1. In a combined fastener and locking means for hinged hatch covers of refrigerator cars, the combination with an abutment on the cover adjacent to its free edge; of an arm swingingly mounted on a fixed support adjacent to said cover, said arm being pivoted on an axis parallel to the axis of swinging movement of the cover and foldable against the cover into engagement with said abutment to force the cover tightly closed; and latch means on the cover, including a weighted finger pivoted between its ends for rotary movement about its pivot, said finger having a locking projection at one side of the pivot thereof engageable over the outer end of said arm to lock the latter in folded position, said projection having a cam face thereon adapted to be engaged by said arm while being folded against said cover to rock said latch means on its pivot to swing the locking projection free of the end of said arm.

2. In a combined fastener and locking means for hinged hatch covers of refrigerator cars, the combination with an abutment on the cover adjacent to its free edge; of an arm swingingly mounted on a fixed support adjacent to said cover, said arm being pivoted on an axis parallel to the axis of swinging movement of the cover and foldable against the cover into engagement with said abutment to force the cover tightly closed; and latch means on the cover, including a finger pivoted between its ends for rotation on its pivot, a locking projection on said finger to one side of its pivot, said locking projection being engageable over the free end of said arm to lock the latter in folded position, and a weighted portion on said finger at the other side of the pivot thereof to urge said finger into locking relation with respect to the end of said arm.

3. In a combined fastener and locking means for hinged hatch covers of refrigerator cars, the combination with an abutment on the cover adjacent to its free edge; of an arm swingingly mounted on a fixed support adjacent to said cover, said arm being pivoted on an axis parallel to the axis of swinging movement of the cover and foldable against the cover into engagement with said abutment to force the cover tightly closed; a latch member pivoted on the cover; a finger on said member at one side of the pivot thereof engageable with the free end of the arm; an operating lever on said member at the other side of the pivot thereof for swinging said member in reverse directions to either engage the same with the end of the first named arm or disengage it therefrom; and a shoulder on said finger in the path of movement of the free end of the first named arm and engaged by said end during swinging movement of said arm to throw the finger clear of the same.

4. In a combined fastener and locking means for hinged hatch covers of refrigerator cars, the combination with an abutment on the cover adjacent to its free edge; of an arm swingingly mounted on a fixed support adjacent to said cover, said arm being pivoted on an axis parallel to the axis of swinging movement of the cover and foldable against the cover into engagement with said abutment to force the cover tightly closed; a swinging latch element including a finger engageable with the free end of the arm to lock the latter in folded position; means on said latch element also engageable with the free end of the arm to check upward movement of the arm when the latch member is disengaged from said arm; and means for actuating said latch element to swing the finger thereof either into or out of engagement with the free end of said arm.

5. In a combined fastener and locking means for hinged hatch covers of refrigerator cars, the combination with an abutment on the cover adjacent to its free edge; of an arm swingingly mounted on a fixed support adjacent to said cover, said arm being pivoted on an axis parallel to the axis of swinging movement of the cover and foldable against the cover into engagement with said abutment to force the cover tightly closed; a pivoted latch block on the cover; a latch finger on said block engageable with the free end of the arm to lock the same in folded position; a stop shoulder on said block movable into the path of the end of the arm to check upward movement of the latter when said block is rocked to disengage the finger from said arm; and an operating lever arm on said block for swinging the same to disengage said finger from the first named arm and move the shoulder into the path of movement of said first named arm.

6. In a combined fastener and locking means for hinged hatch covers of refrigerator cars, the combination with an abutment on the cover adjacent to its free edge, of an arm swingingly mounted on a fixed support adjacent to said cover, said arm being pivoted on an axis parallel to the axis of swinging movement of the cover and foldable against the cover into engagement with said abutment to force the cover tightly closed, said arm having a curved seat at the free end thereof; and latch means on the cover, including a pivoted finger having a cam face engageable by the end of said arm to swing the finger clear of said arm, said finger also having a rounded end spaced from said cam face engageable within the seat of said arm to lock the arm in folded position.

7. In a combined fastener and locking means for hinged hatch covers of refrigerator cars, the combination with an abutment on the cover adjacent to its free edge; of an arm swingingly mounted on a fixed support adjacent to said cover, said arm being pivoted on an axis parallel to the axis of swinging movement of the cover and foldable against the cover into engagement with said abutment to force the cover tightly closed, said arm having a seat at the free end thereof and an upstanding lug projecting beyond said seat; a swinging latch element having a projection engageable within said seat to lock the arm in folded position; an abutment on said latch element engageable with the lug of said arm when the latch element is swung to disengage the projection from said seat; and means for actuating said latch element to swing the projection thereof either into or out of engagement within the seat of said arm.

8. In a combined fastener and locking means for hinged hatch covers of refrigerator cars, the combination with an abutment on the cover adjacent to its free edge; of an arm swingingly supported on a fixed support adjacent to said cover, said arm being pivoted on an axis parallel to the axis of swinging movement of said cover and foldable against the cover; an adjustable abutment block fixed to said arm between the ends thereof, said block being engageable with the abutment of the cover to force the latter tightly closed, said block having an eccentric opening therethrough; a bolt extending through said opening of the block for securing the block to said arm in different adjusted positions; and latch means for locking said arm in folded position.

9. In a combined fastener and locking means for hinged hatch covers of refrigerator cars, the combination with an abutment on the cover adjacent to its free edge; of an arm swingingly supported on a fixed support adjacent to said cover, said arm being pivoted on an axis parallel to the axis of swinging movement of said cover and foldable against the cover; an abutment on said arm between the ends thereof engageable with the abutment of the cover to force the latter tightly closed, said abutment of the arm being adjustable to project the same different distances from the inner face of the arm; and latch means for locking said arm in folded position.

10. In a combined fastener and locking means for hinged hatch covers of refrigerator cars, the combination with an abutment on the cover adjacent to its free edge, said abutment including a lug projecting beyond the edge of the cover; an arm swingingly mounted on a fixed support adjacent to said cover, said arm having a pivoted dog thereon engageable with the lug of said abutment to force the cover open when said arm is swung in one direction; and a stop shoulder for holding said dog against pivotal movement during the time the arm is swung in one direction, said dog being free to swing to clear said lug when said arm is swung in a reverse direction.

11. In a combined fastener and locking means for hinged hatch covers of refrigerator cars, the combination with an abutment member on the cover adjacent to its free edge, said member having an upstanding lug projecting laterally beyond the edge of the cover, said lug having a top abutment face; of an arm swingingly mounted on a fixed support adjacent to said free edge of the cover, said arm having a pivoted dog thereon swingable in one direction to clear said lug when said arm is being swung downwardly, and held against movement in a reverse direction to engage said lug to force the cover open when the arm is swung upwardly, said arm also having an abutment face between the ends thereof engageable with the top face of said lug to force the cover closed when the arm is swung in a reverse direction.

12. In a combined fastener and locking means for hinged hatch covers of refrigerator cars, the combination with an abutment on the cover adjacent to its free edge, said abutment including a lug projecting beyond the end of the cover, said lug having a pin-receiving opening therethrough; of an arm swingingly mounted on a fixed support adjacent to the free edge of said cover, said arm having a plurality of spaced pin-receiving openings therein; a dog pivotally mounted on said arm and engageable with the lug of said abutment to force the cover open when said arm is swung in one direction; means for holding said dog against pivotal movement while said arm is operated in said direction; and a pin engageable through the opening of said lug and one of the openings of said arm to support said cover in partly open position.

13. In a combined fastener and locking means for hinged hatch covers of refrigerator cars, the combination with a bracket member fixed to the cover at the free edge thereof, said bracket member having a perforated lug projecting beyond the edge of said cover, said lug having a top abutment face; of an arm swingingly mounted on a fixed support on the roof of the car adjacent to the free edge of said cover, said arm having a plurality of spaced pin-receiving openings therein; a stop on said arm; a dog pivoted on said arm, said dog being held against movement by engagement with said stop, said dog being held by said stop to engage said lug of the bracket to force the cover open when the arm is swung in one direction, said arm also having abutment means between the ends thereof engageable with the top abutment face of the lug to force said cover tightly closed when the arm is swung in a reverse direction, thereby folding the same over the cover, said arm being swingable upwardly at an angle to the roof of the car to provide a support for holding said cover partly open; and a locking element insertable through the perforation of said lug and one of the openings of said arm to connect the cover to said arm and support the cover in partly open position.

14. In a combined fastener and locking means for hinged hatch covers for hatchways of refrigerator cars, the combination with an arm swingingly supported adjacent to the hatchway at the free edge of said cover; of means on said arm having shouldered engagement with the cover to pry the cover upwardly when the arm is swung in one direction, and yieldable to clear said cover when the arm is swung in a reverse direction, said arm being folded over the cover when swung in said reverse direction; abutment means on said arm between the ends thereof engageable with the outer surface of the cover when the arm is folded over the cover to force the latter tightly closed; and cooperating means on said arm and cover for holding the latter partly open when the arm is in raised position.

WILLIAM M. DWYER.